United States Patent
Simard-Bergeron et al.

(10) Patent No.: US 10,851,671 B2
(45) Date of Patent: Dec. 1, 2020

(54) BENDING STIFFENING FEATURE USED FOR COMPLIANT JOURNAL BEARING

(71) Applicant: PRATT & WHITNEY CANADA CORP., Longueuil (CA)

(72) Inventors: Julien Simard-Bergeron, Montreal (CA); Louis Brillon, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/369,808

(22) Filed: Mar. 29, 2019

(65) Prior Publication Data
US 2020/0308985 A1    Oct. 1, 2020

(51) Int. Cl.
| | | |
|---|---|---|
| F16C 27/02 | (2006.01) | |
| F01D 25/16 | (2006.01) | |
| F01D 9/04 | (2006.01) | |
| F01D 5/02 | (2006.01) | |
| F16C 19/16 | (2006.01) | |

(52) U.S. Cl.
CPC .......... F01D 25/164 (2013.01); *F01D 5/027* (2013.01); *F01D 9/041* (2013.01); *F05D 2220/32* (2013.01); *F05D 2240/54* (2013.01); *F05D 2240/91* (2013.01); *F05D 2260/15* (2013.01); *F16C 19/16* (2013.01); *F16C 2360/23* (2013.01)

(58) Field of Classification Search
CPC ...... F16C 27/02; F16C 27/04; F16C 2360/23; F16C 2361/61; F16H 57/021; F16H 57/0479; F16H 57/082; F16H 2057/085; F04D 2240/53; F04D 2240/54
See application file for complete search history.

(56) References Cited

U.S. PATENT DOCUMENTS

| | | | |
|---|---|---|---|
| 4,195,395 A | 4/1980 | Silver et al. | |
| 4,900,165 A | 2/1990 | Kun et al. | |
| 5,102,379 A | 4/1992 | Pagluica et al. | |
| 5,391,125 A | 2/1995 | Turra et al. | |
| (Continued) | | | |

FOREIGN PATENT DOCUMENTS

| | | |
|---|---|---|
| CN | 105065649 A | 11/2015 |
| CN | 104074926 B | 5/2016 |
| (Continued) | | |

*Primary Examiner* — Phillip A Johnson
(74) *Attorney, Agent, or Firm* — Norton Rose Fulbright Canada LLP (57) ABSTRACT

A journal bearing for a gas turbine engine is described. The journal extends along a central axis from a first axial end face to a second axial end face thereof, and has at least one undercut defined circumferentially about the central axis in one of the first and second axial end faces. The undercut extends toward the other one of the first and second axial end faces of the journal. A stiffening member extends across the undercut to interconnect opposite surfaces thereof. Also described, a journal bearing comprising a tubular body extending axially along a central axis, where the tubular body has a first and a second opposite axial end faces with holes projecting into the first axial end face toward the second axial end face and having a finite depth. The holes are circumferentially disposed about the central axis, and respective webs of material are defined between adjacent holes. A method of operating a journal bearing is also provided.

20 Claims, 4 Drawing Sheets

(56) References Cited

U.S. PATENT DOCUMENTS

| | | | | |
|---|---|---|---|---|
| 5,472,383 A | * | 12/1995 | McKibbin | F16H 57/0482 184/6.12 |
| 5,558,594 A | | 9/1996 | Lefranc et al. | |
| 6,364,805 B1 | | 4/2002 | Stegherr | |
| 6,520,886 B2 | | 2/2003 | Schwertberger | |
| 6,964,155 B2 | * | 11/2005 | McCune | F02C 7/36 384/297 |
| 7,340,834 B1 | | 3/2008 | Howell et al. | |
| 7,591,754 B2 | * | 9/2009 | Duong | F16D 3/72 475/347 |
| 7,883,438 B2 | | 2/2011 | McCune | |
| 8,020,665 B2 | | 9/2011 | Sheridan et al. | |
| 8,215,454 B2 | | 7/2012 | Portlock et al. | |
| 8,216,108 B2 | | 7/2012 | Montestruc | |
| 8,246,503 B2 | | 8/2012 | Sheridan et al. | |
| 8,262,535 B2 | | 9/2012 | Klingels | |
| 8,398,517 B2 | | 3/2013 | McCune et al. | |
| 8,414,448 B2 | | 4/2013 | Madge et al. | |
| 8,511,435 B2 | | 8/2013 | Sheridan et al. | |
| 8,550,957 B2 | | 10/2013 | Erno et al. | |
| 8,574,118 B2 | | 11/2013 | McCune | |
| 8,591,371 B2 | | 11/2013 | Dinter et al. | |
| 8,690,721 B2 | | 4/2014 | McCune | |
| 8,777,802 B2 | | 7/2014 | Erno et al. | |
| 8,813,469 B2 | | 8/2014 | Sheridan | |
| 8,814,746 B2 | | 8/2014 | Fox | |
| 8,894,529 B2 | | 11/2014 | McCune | |
| 8,899,916 B2 | | 12/2014 | McCune et al. | |
| 8,911,318 B2 | | 12/2014 | Iizuka | |
| 8,986,160 B2 | | 3/2015 | Altamura et al. | |
| 9,145,967 B2 | | 9/2015 | Fox et al. | |
| 9,328,818 B2 | | 5/2016 | Coffin et al. | |
| 9,404,568 B2 | | 8/2016 | Feraud | |
| 9,464,708 B2 | | 10/2016 | Coffin et al. | |
| 9,945,259 B2 | | 4/2018 | Cigal et al. | |
| 9,982,771 B2 | | 5/2018 | Muldoon | |
| 9,995,176 B2 | | 6/2018 | Belmonte et al. | |
| 10,066,734 B2 | | 9/2018 | Sheridan | |
| 10,119,417 B2 | | 11/2018 | Bucking | |
| 2004/0192491 A1 | * | 9/2004 | Becquerelle | F16C 19/28 475/331 |
| 2012/0053009 A1 | * | 3/2012 | Minadeo | F16H 1/2836 475/346 |
| 2013/0184120 A1 | * | 7/2013 | Altamura | F16H 1/2836 475/346 |
| 2013/0319006 A1 | | 12/2013 | Parnin | |
| 2016/0201793 A1 | * | 7/2016 | Muldoon | F16H 1/28 475/159 |
| 2017/0108035 A1 | | 4/2017 | Hinds | |
| 2019/0162292 A1 | * | 5/2019 | Nique | F02C 7/36 |

FOREIGN PATENT DOCUMENTS

| | | |
|---|---|---|
| GB | 903210 A | 8/1962 |
| JP | 2009197821 A | 9/2009 |

* cited by examiner

BENDING STIFFENING FEATURE USED FOR COMPLIANT JOURNAL BEARING

TECHNICAL FIELD

The present invention relates generally to mounting devices for rotating assemblies of gas turbine engines, and more particularly to journal bearings for such engines.

BACKGROUND

Turbine engines typically includes a number of rotating components or parts mounted together via mounting devices providing suitable support and allowing axial and/or rotational movement between such components. Those mounting devices may be journal bearings. Journal bearings may be required to offer some compliance in order to improve oil film pressure distribution and/or thickness since they tend to concentrate the load at stiffer locations of their assembly. However, compliance may also lead to undesirable pressure variations along the length and/or over the periphery of the journal bearings.

SUMMARY

In one aspect, there is provided a journal bearing for a gas turbine engine, comprising: a journal extending along a central axis from a first axial end face to a second axial end face thereof, and having at least one undercut defined circumferentially about the central axis in one of the first and second axial end faces and extending toward the other one of the first and second axial end faces of the journal, a stiffening member extending across the undercut to interconnect opposite surfaces of the undercut.

In another aspect, there is provided a method of operating a journal bearing, the journal bearing having a journal extending along a central axis, the journal having at least one undercut defined circumferentially about the central axis at an axial end face thereof, the method comprising: transmitting a journal bearing load to the journal in a direction transverse to the central axis, responsive to said journal bearing load, deforming elastically an axial end portion of the journal, the axial end portion extending from the axial end face of the journal, and limiting a local deformation of the axial end portion of the journal via a stiffening member extending radially across the undercut and interconnecting opposite surfaces of the undercut.

In a further aspect, there is provided a journal bearing for a gas turbine engine, comprising a tubular body extending axially along a central axis, the tubular body having a first and a second opposite axial end faces, holes projecting into the first axial end face toward the second axial end face and having a finite depth, the holes circumferentially disposed about the central axis, and respective webs of material defined between adjacent holes.

BRIEF DESCRIPTION OF THE DRAWINGS

Reference is now made to the accompanying figures in which.

DETAILED DESCRIPTION

Figure 1:
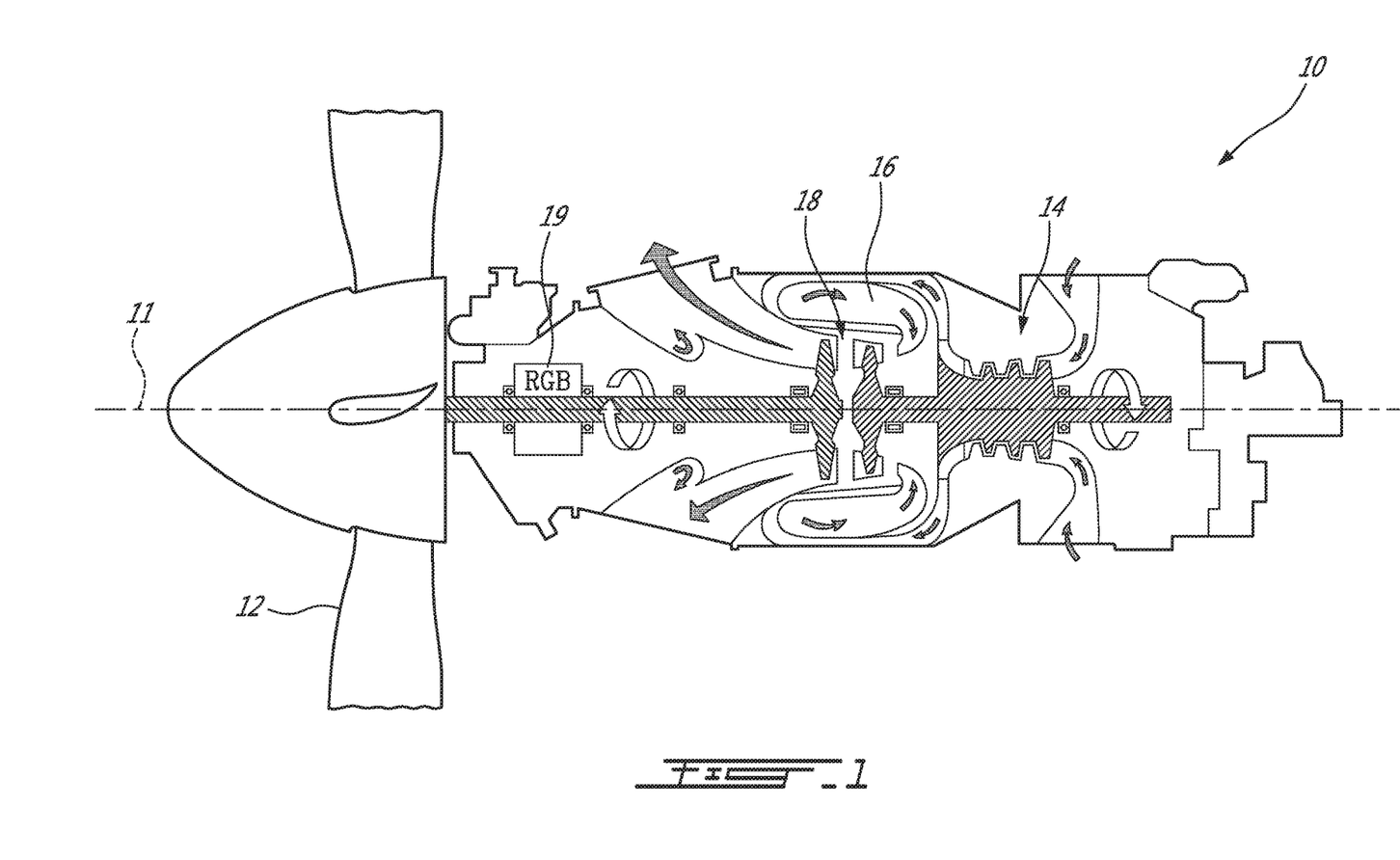
FIG. 1 is a schematic cross-sectional view of a gas turbine engine.

FIG. 1 illustrates a gas turbine engine 10 of a type preferably provided for use in subsonic flight and configured for driving a load 12, such as, but not limited to, a propeller or a helicopter rotor. Depending on the intended use, the engine 10 may be any suitable aircraft engine, and may be configured as a turboprop engine or a turboshaft engine. The gas turbine engine 10 generally comprises in serial flow communication a compressor section 14 for pressurizing the air, a combustor 16 in which the compressed air is mixed with fuel and ignited for generating an annular stream of hot combustion gases, and a turbine section 18 for extracting energy from the combustion gases. Also shown is a central longitudinal axis 11 of the engine 10. Even though the present description specifically refer to a turboprop engine as an example, it is understood that aspects of the present disclosure may be equally applicable to other types of combustion engines in general, and other types of gas turbine engines in particular, including but not limited to turboshaft or turbofan engines, auxiliary power units (APU), and the like.

Figure 2:
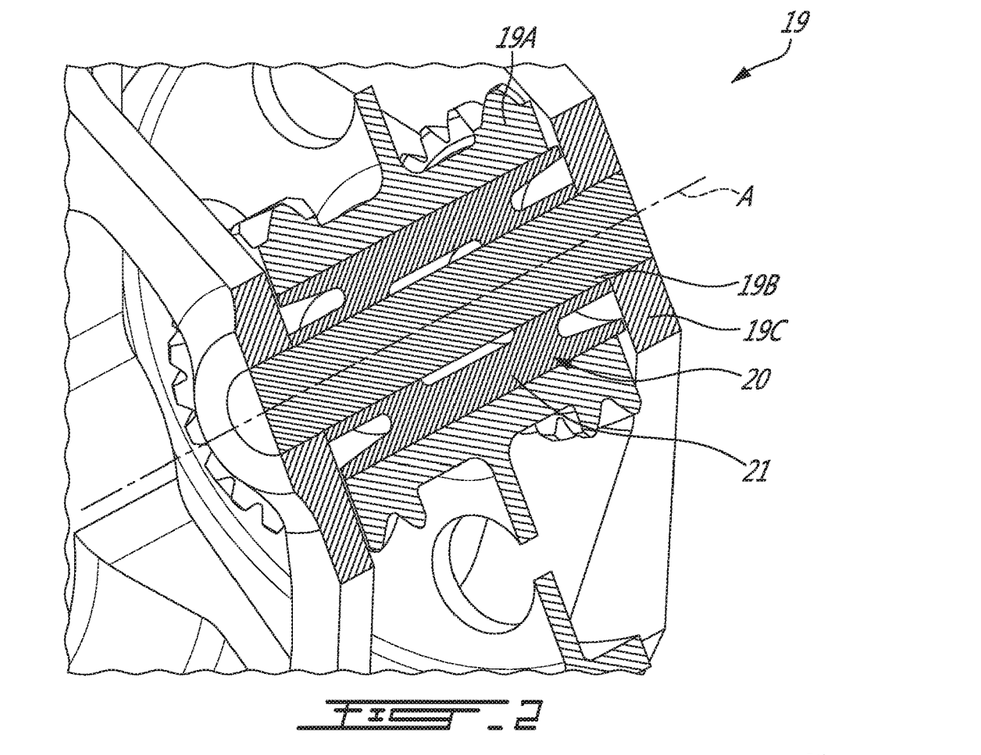
FIG. 2 is a partial perspective view, partly cutaway, of a gear assembly as used in the engine of FIG. 1 and showing a journal bearing with a journal, according to an embodiment.

The gas turbine engine 10 also includes rotating parts or assemblies, such as gear assemblies 19 (e.g. epicycle reduction systems, planetary/reduction gearboxes, or other types of rotating assemblies) with rotating components mounted thereto using mounting devices allowing rotational and/or axial movement. In the embodiment shown, the gear assembly 19 is mounted at the front end of the engine 10. An example of a gear assembly 19 as used in the engine 10 is shown in FIG. 2. In the depicted embodiment, the gear assembly 19 is part of an epicycle reduction system, also known as epicyclic gear train, epicyclic gearbox, planetary gearbox, etc., including one or more mounting devices, which is in FIG. 2 a journal bearing 20 having a journal 21, also referred to as a journal shaft. The journal bearing 20 may be used for interfacing a rotating part 19A on a pin 19B connected to a structure 19C. In the example shown, the rotating part 19A is a gear. The gear may be an epicycle gear of epicycle reduction system, mounted on the journal bearing 20 which is engaged on the pin 19B supported at both ends between two axially spaced plates forming at least part of the structure 19C of the epicycle gear system. Although not shown, other types of bearings may be used, such as roller bearings, ball bearings or any other suitable types of bearings. The journal bearing 20 may include a sleeve (not shown) disposed radially outwardly to the journal 21 relative to a central axis A of the journal bearing 20. Such sleeve, when present, may be used to form an outer peripheral surface of the journal bearing 20. Otherwise, the outer periphery/surface of the journal 21 may contact directly the rotating part 19A it supports, with reference to what is shown in FIG. 2, for instance.

Figure 3:
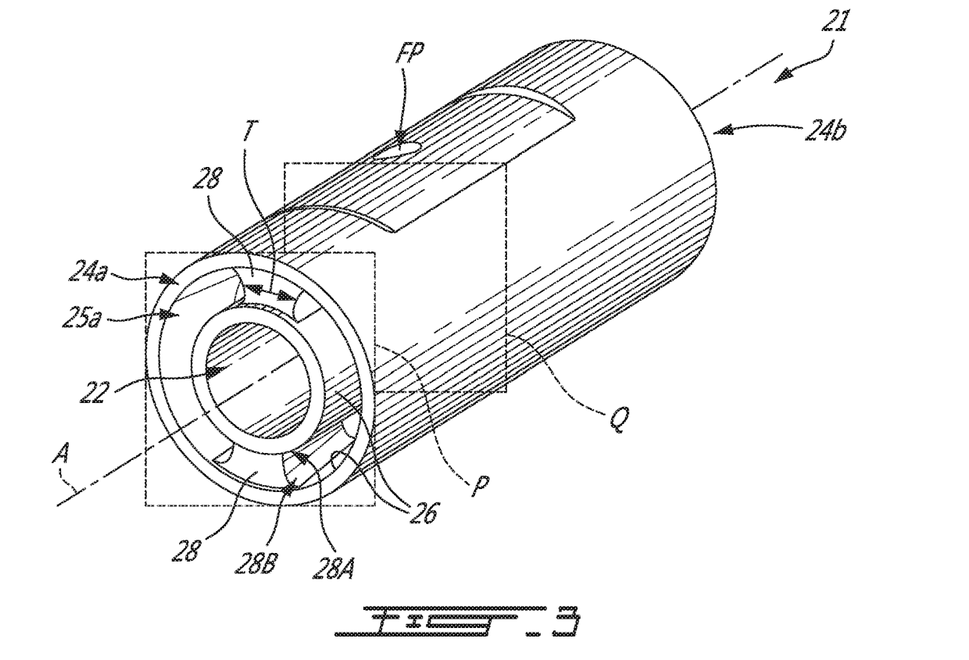
FIG. 3 is a perspective view of the journal of the journal bearing such as one shown in FIG. 2.
Figure 4:
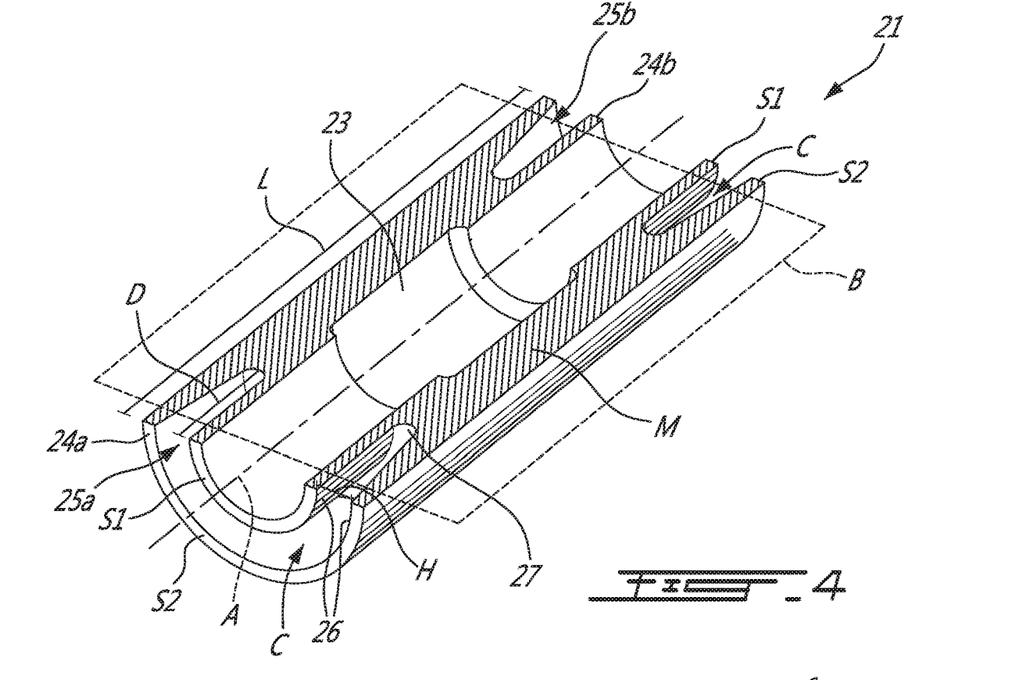
FIG. 4 is a perspective view of the journal of FIG. 3 cut along an axial plane B of the journal bearing.

Referring to FIGS. 3 and 4, a journal 21 of a journal bearing 20 such as one shown in FIG. 2, is illustrated in isolation. The journal 21 extends along the central axis A, which central axis A is the rotation axis of the rotating part 19A. The journal 21 has a pin-receiving aperture 22 extending along the central axis A and defining a pin-engaging surface. The pin-receiving aperture 22 may thus receive the pin 19B of the gear assembly 19 when mounted within such assembly 19.

Depending on the configuration, the journal bearing 20 may be adapted for having its journal 21 rotatably engaged with the pin 19B, such that the journal 21 may rotate about the pin 19B, concurrently with the rotating part 19A fixed thereon. The journal bearing 20 may be adapted for having its journal 21 rotatably engaged with the rotating part 19A it supports, such that the journal 21 may be rotatably fixed relative to the pin 19B and may have the rotating part 19A mounted thereto rotatable relative to the journal 21. A lubricating fluid film, such as an oil film, may be received between rotating components of the journal bearing 20 to facilitate rotation of said components relative to one another. In the depicted embodiment, the pin-engaging surface defines an annular recess 23 opened toward the pin receiving aperture 22, though it may also be on the outer surface of the journal bearing 20. In the depicted embodiment, the pin-engaging surface has only one annular recess 23, but there may be a number (i.e. more than one) annular recess 23 in other embodiments. The recess(es) 23 may contain the lubricating fluid to reduce friction between the pin 19B and the pin-engaging surface of the pin receiving aperture 22, in an embodiment in which the journal 21 rotates relative to the pin 19B. This may facilitate rotation of the pin 19B inside the pin receiving aperture 22. The lubricating fluid may be channeled to the recess 23. A lubrication system (not shown) may be used to supply oil, or other lubricants, inside the recess 23 to create a film of lubricant between static and rotating parts of the gear assembly 19, including the pin 19B and the journal 21 arrangement discussed herein. The recess 23 may thus be fluidly connected to the lubrication system via a fluid passage FP (FIG. 3) passing through the tubular body forming the journal 21.

The journal 21 has opposite axial end faces 24a, 24b. The journal 21 has a length L defined between the opposite axial end faces 24a, 24b. In the embodiment shown, the axial end faces 24a, 24b are flat surfaces. The axial end faces 24a, 24b may have bulges or non-flat surface features in other embodiments. Still referring to FIGS. 3 and 4, undercuts 25a and/or 25b are located in the journal 21, i.e., at one or both of the axial end faces. There may have only undercut 25a at one axial end face 24a, and not undercut 25b at the opposite axial end face 24b in some embodiments. The undercuts 25a, 25b are configured for allowing radial compliance or flexibility to the journal bearing 20. Each of the two undercuts 25a, 25b is located at a respective one of journal first and second axial end faces 24a, 24b. Each of the two undercuts 25a, 25b defines an annular channel C circumferentially extending around the central axis A. If present, the first undercut 25a projects from the first axial end face 24a toward the second axial end face 24b. If present, the second undercut 25b projects from the second axial end face 24b toward the first axial end face 24a. The journal 21 may thus have cantilever sections S1, S2 which extend axially toward the end faces 24a, 24b from a merged zone M located axially in between them. In other words, the journal bearing 20 comprises a tubular body, which forms the journal 21, with concentric tubular subsections extending axially from the opposite axial end faces 24a and/or 24b toward a main central portion defined by the merged zone M of the tubular body, and respective annular channels C, i.e., the undercuts 25a, 25b, are defined between these concentric tubular sections on opposed ends of the tubular body. The outwardmost tubular subsections include respective cantilever sections S2, as discussed above. The cantilever sections S1, S2 may thus allow the journal 21 to be compliant and deflect upon receiving journal bearing loads. As shown, the concentric tubular sections at one end face 24a/24b may merge toward the central portion to form the corpus of the tubular body. Even though in the embodiment shown the central portion of the tubular body is plain between the concentric tubular sections of the opposed sides of the tubular body, the central portion may be lightened by material removal, such as by making grooves or recesses on its outer surface, for instance, and notwithstanding the annular recess 23 that may be present.

In the depicted embodiment, the two undercuts 25a, 25b are symmetrical relative to one another about the plane Q disposed axially at equal distance from the two axial end faces 24a, 24b. A vector of the axis of rotation A is normal to the plane Q. The plane Q is a mid-plane of the journal bearing 20. However, the two undercuts 25a, 25b may not be symmetrical relative to one another, or there may be only undercut 25a at one end face 24a and no undercut 25b at the other end face 24b. Also shown, the undercuts 25a, 25b each define opposite surfaces 26, which circumscribe the undercuts 25a, 25b. In other words, the opposite surfaces 26 face each other and define the undercuts 25a, 25b walls. In some variants, the journal 21 may have an undercut 25a at only one of the axial end faces 24a, 24b.

Each of the two undercuts 25a, 25b has a height H at the axial end faces 24a, 24b. The height H is defined radially relative to the central axis A, and may be constant or may vary. A depth D is defined axially relative to the central axis A. The height H and the depth D are selected such that the stiffness of the journal bearing 20 to radial loads is adjusted on the central axis A defined by the journal 21 to make it compliant to journal bearing forces so that the resultant journal bearing load may be better distributed along the central axis A as compared to a configuration lacking such undercuts 25a, 25b. This may be implemented by a continuous inward tapering shape or in any other appropriate shape. For instance, in the embodiment shown, the opposite surfaces 26 of the undercuts 25a, 25b taper until converging to form a bend 27 of the undercuts 25a, 25b. The depth D may thus be the maximal depth dimension from axial end face 24a/24b to the bend 27 surface.

A ratio of the height H over the depth D ("H/D ratio") may be greater than 0.2. In a particular embodiment the H/D ratio is 0.24±0.02. A height H of the undercuts 25a, 25b over length L of the journal 21 ratio ("H/L ratio") may be greater than 0.06. In a particular embodiment, the H/L ratio is 0.062±0.002. A ratio of the depth D over the length L ("D/L ratio") may range between 0 and 0.5. In a particular embodiment, the D/L ratio is 0.26±0.02.

A bending stiffness of the journal 21 may be adjusted, including the bending stiffness of the journal 21 at its opposed ends, such that upon loading the journal bearing 20, for instance by bending forces exerted by a pin 19B disposed inside the pin-receiving aperture 22, the journal 21 may tend to bend while keeping a straighter peripheral surface under load. The journal 21 of the journal bearing 20 includes one or more stiffening member(s) 28 extending radially across the undercut 25a, 25b and interconnecting or spanning across the opposite surfaces 26 of the undercut 25a. In an embodiment, such as shown in FIG. 3, the journal 21 includes two stiffening members 28 inside the undercut 25a and/or 25b. There may be more than two (i.e. any suitable number) stiffening members 28 in other embodiments, in one or both undercuts 25a, 25b. Depending on the embodiments, the plurality of stiffening members 28 may be evenly distributed about the pin-engaging aperture 22 or on the circumference of the journal 21, but an uneven circumferential distribution of the stiffening members 28 may also be contemplated in certain configurations of the journal bearing 20, for instance dependent on the loadings applied on the journal bearing 20 and/or loading directions.

In the embodiment shown, the two stiffening members 28 are disposed on opposed sides of the pin receiving aperture 22, for instance to be diametrically opposed. Each of the stiffening members 28 interconnects the opposite surfaces 26 of the undercut 25a. Even though the two stiffening members 28 shown in this embodiment are disposed axisymmetrically about the central axis A, this may be different in other embodiments. Also, as shown, the two stiffening members 28 are identical in shape, though respective stiffening members 28 may be shaped differently from each other in other embodiments. Having non-identical stiffening members 28 in one or both the undercuts 25a, 25b (i.e. within the same undercut 25a/25b or from both undercuts 25a, 25b) may allow to have a different stiffness, for instance a bending stiffness, at one location about the circumference of the journal 21 at one axial end face and/or at both axial end faces 24a, 24b of the journal 21. This may allow to compensate unequal deformation of the journal 21 depending on the types and/or distribution of journal bearing load applied thereon. The circumferential position of the stiffening members 28 within the undercuts 25a, 25b may be determined based on the loading conditions. For instance, the load on some journal bearings 20 may not rotate so the need for axisymmetric journal 21 may not be required in some cases. This may allow positioning stiffening members 28 where there is no need for compliance or need for a lesser compliance or greater stiffness. As such, journal 21 distortion due to load (for example bending) may be limited while compliance may be maintained at the opposed ends of the journal 21.

As discussed above, the undercuts 25a, 25b may have a tapering profile from their respective end face 24a, 24b where the opposite surfaces 26 of respective undercuts 25a, 25b may merge to form the bend 27. In this case, the stiffening member(s) 28 may extend axially and taper from their respective axial end face 24a, 24b to their respective bend 27, just as the opposite surfaces 26. The stiffening member(s) 28, in some embodiments, may extend along the full depth D of the undercut(s) 25a, 25b. However, the stiffening member(s) 28 may extend axially over less than the depth D of the undercut(s) 25a, 25b. In some cases the stiffening member(s) 28 may coincide with the axial end faces 24a, 24b and extend axially over a fraction of the depth D. In other cases, the stiffening member(s) 28 may coincide with an axial end of the undercut(s) 25a, 25b, for instance the bend 27 when present, and extend axially toward their respective axial end face 24a, 24b (i.e. toward the open side of the undercut(s) 25a, 25b). The stiffening member(s) 28 may also be spaced from the ends of the undercut(s) 25a, 25b.

In the depicted embodiment, the stiffening members 28 has a radially convergent-divergent profile such that a thickness T of a radially outward portion 28B and a radially inward portion 28A of the stiffening members 28 decreases toward one another when viewed in a plane normal to the central axis A of the journal bearing 20. As will be discussed later with respect to another embodiment, the stiffening member(s) 28 may have a radially tapering profile such that a thickness T of the stiffening member(s) 28 may decrease from a radially outward portion 28B to a radially inward portion 28A of the stiffening member(s) 28 when viewed in a plane P normal to the central axis A of the journal bearing 20. This may be different in other embodiments.

Figure 5:
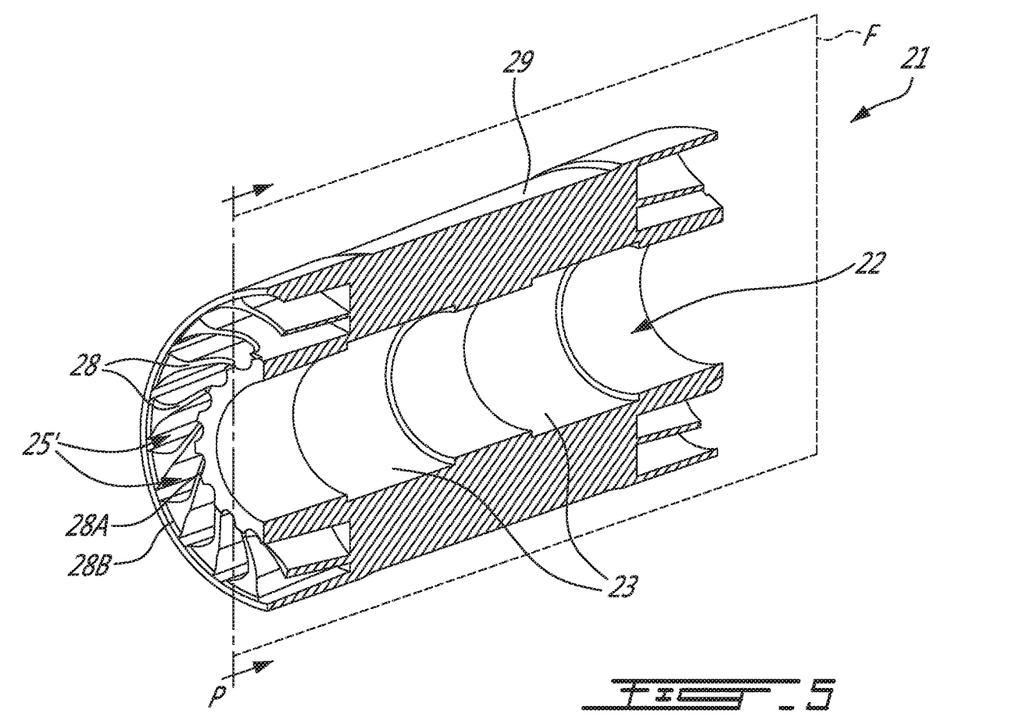
FIG. 5 is a perspective view of another example of the journal as used in FIG. 2, cut along an axial plane C of the journal bearing.
Figure 6:
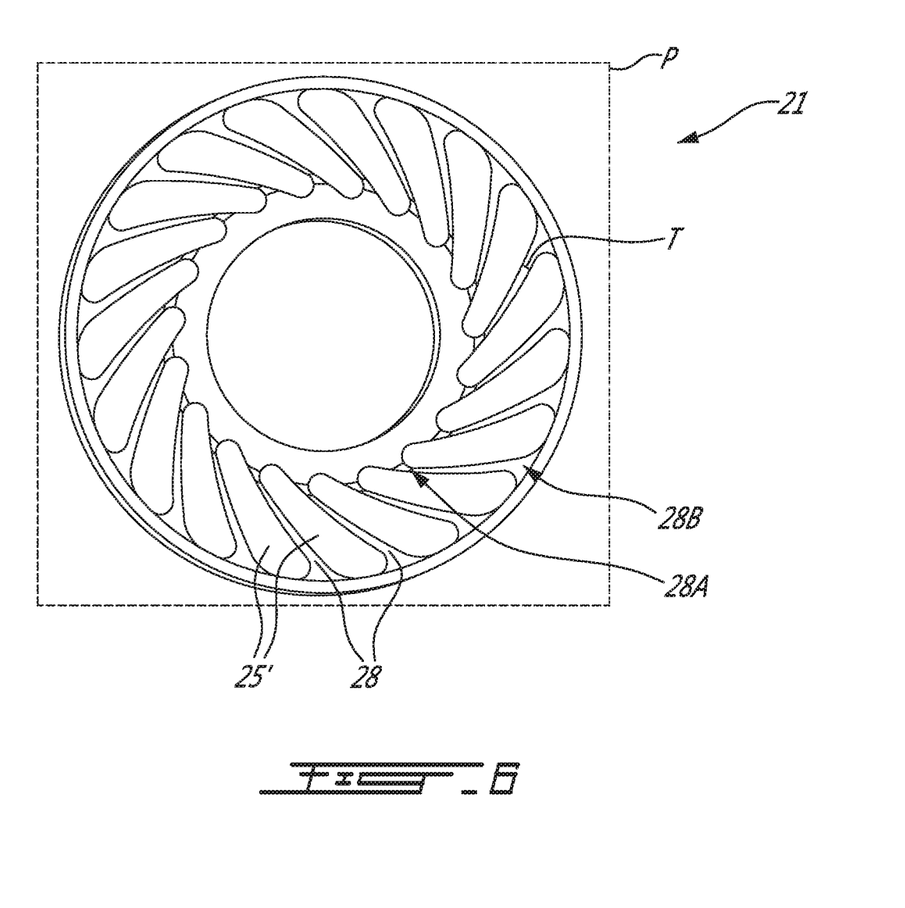
FIG. 6 is a cross-sectional view of the journal of FIG. 5, taken in a plane P normal to a central axis A of the journal bearing.

Referring to FIGS. 5 and 6, another example of the journal 21 for the journal bearing 20 is shown. The journal 21, still in the form of a tubular body, has a first and a second opposite axial end faces 24a, 24b with holes 25' projecting into the first axial end face 24a toward the second axial end face 24b and having a finite depth D. The holes 25' are circumferentially disposed about the central axis A, and stiffening members 28 in the form of webs of material are defined between adjacent holes 25'. Referring back to the embodiment shown at least in FIGS. 3 and 4, the tubular body forming the journal 21 illustrated may have two holes 25'/portions of channel C in the first axial end face 24a and/or axial end face 24b, and two stiffening members 28 each defined between respective circumferential ends of said holes 25'.

Returning to FIGS. 5 and 6, the journal 21 may have a plurality of stiffening members 28 in the form of webs of material extending radially between the pin-engaging aperture 22 and the outer surface of the journal 21 or tubular body. In the depicted embodiment, the stiffening members 28 are evenly circumferentially distributed about the pin-engaging aperture 22. The stiffening members 28 may be circumferentially skewed and/or form an array of spiral shaped ribs, such as in the embodiment shown, but this may be different in other embodiments. Still referring to FIGS. 5 and 6, the stiffening members 28 may have a radially tapering profile such that a thickness T of the stiffening members 28 may decrease from a radially outward portion 28B to a radially inward portion 28A of the stiffening members 28 when viewed in a plane P normal to the central axis A of the journal bearing 20. Also shown in FIG. 5, the pin-engaging aperture 22 includes two annular recesses 23 axially separated. In an embodiment, such as shown, the outer surface of the tubular body has a recessed area 29 defined therein. This recessed area 29 may contain a lubricant film and allow for a reduced friction interface with a rotating part 19A, which in the example of FIG. 2 is an epicycle gear, mounted over the outer surface of the tubular body.

The loading on the cantilever sections S1, S2 of the journal 21 as described herein, for instance applied in a direction normal to axial plane B may cause them to deflect in a direction opposite to the deflection of the central portion (i.e. merged zone M). This may create undesired peaks in the pressure pattern of the journal bearing 20 at the interface between the journal 21 and the component contacting circumferentially the outer surface of the journal 21. These peaks in the pressure pattern may lead to reduced lifetime of the journal bearing 20. Providing one or more stiffening member 28 that extends radially across an undercut 25a and that interconnects the opposite surfaces 26 of that undercut 25a may allow for adjusting a stiffness, for instance a bending stiffness, of the journal 21, and more particularly a stiffness at one or both of the opposed ends of the journal 21, which may be the bending stiffness of the journal 21 at the undercuts 25a, 25b. This may improve the lubricant film pressure distribution and/or thickness over the length of the journal 21.

In some embodiments, a balance between compliance and journal bending stiffness may be sought to limit journal distortion due to load while still providing compliance of the journal 21 at one or both of its axial ends and/or edges. In some cases, having the stiffening members 28 extending in different direction than the load and/or not aligned with the load direction, for instance perpendicular from each other in some cases, may allow to stiffen the whole journal 21 and keep the journal bearing interface straighter (i.e. the interface between the outer surface of the journal 21 and the part 19A mounted thereon). This may increase the journal 21 capacity to sustain load over an extended lifetime. In operation, a journal bearing load may be transmitted to the journal 21 in a direction transverse to the central axis A of the journal. In response to said journal bearing load, the journal 21 may deform elastically at an axial end portion thereof (i.e. one or both axial end portion), where the axial end portion extends from the axial end face of the journal. According to the embodiments shown, said axial end portion corresponds to the cantilever sections S1, S2 discussed herein. The stiffening member(s) 28, which extend(s) radially across the undercut(s) 25a, 25b and which interconnect(s) opposite surfaces of said undercut(s) 25a, 25b limit(s) a local deformation of said axial end portion(s). Limiting the local deformation of said axial end portion(s) may happen as at least part of the journal bearing load may be transmitted to the stiffening member(s) 28.

The stiffening members 28 and the journal 21 may be integrally formed as a monolithic piece using any suitable manufacturing techniques. Such manufacturing techniques may include any material removal manufacturing techniques, such as machining and/or any additive material manufacturing techniques, such as 3D-printing, for instance. The journal 21, with or without the stiffening members 28 may be molded (e.g. injection-molded) In some variants, the stiffening member(s) 28 may be separate parts inserted inside undercuts 25a, 25b.

The above description is meant to be exemplary only, and one skilled in the art will recognize that changes may be made to the embodiments described without departing from the scope of the invention disclosed. For instance, it may be desirable to have the axial ends of the journal 21 asymmetrically configured, where for instance one axial end may have an undercut 25a while the other one may not, or one axial end may have an undercut 25a with at least one stiffening member 28 while the other axial end of the journal 21 may have an undercut 25b without any of such stiffening member. Also, in instances where there are undercuts 25a, 25b at both axial ends of the journal 21, each undercut 25a/25b may have different shape, size and/or dimensions, including as regards their respective height H, depth D, length L, or ratio thereof, cross-section and/or profile. As such, each axial end of the journal 21 may be customized in order to compensate unbalanced journal bearing loads or unevenly distributed journal bearing loads applied on the journal, for instance, while still providing suitable support for the part(s) 19A mounted thereon. Still other modifications which fall within the scope of the present invention will be apparent to those skilled in the art, in light of a review of this disclosure, and such modifications are intended to fall within the appended claims.

The invention claimed is:

1. A journal bearing for a gas turbine engine, comprising:
a journal extending along a central axis from a first axial end face to a second axial end face thereof, the journal having a pin receiving aperture extending along the central axis through the journal from the first axial end face to the second axial end face, and having at least one undercut defined circumferentially about the central axis in the first and/or second axial end faces and extending toward the other one of the first and second axial end faces of the journal,
a stiffening member extending across the undercut to interconnect opposite surfaces of the undercut.

2. The journal bearing as defined in claim 1, wherein the journal bearing comprises a plurality of said stiffening member interconnecting the opposite surfaces of the undercut.

3. The journal bearing as defined in claim 2, wherein the journal bearing comprises two stiffening members interconnecting the opposite surfaces of the undercut, the two stiffening members disposed on opposed sides of the pin receiving aperture.

4. The journal bearing as defined in claim 3, wherein the two stiffening members are disposed axisymmetrically about the central axis.

5. The journal bearing as defined in claim 1, wherein the pin receiving aperture defines a pin engaging surface, the pin engaging surface defining one or more annular recess opened toward the pin receiving aperture.

6. The journal bearing as defined in claim 1, wherein the opposite surfaces of the undercut taper until converging to form a bend of the undercut, the stiffening member extending axially and tapering from the first axial end face to the bend.

7. The journal bearing as defined in claim 1, wherein the undercut is a first undercut and the stiffening member is a first stiffening member, the journal having a second undercut defined circumferentially about the central axis at the second axial end face of the journal and extending toward the first axial end face, a second stiffening member extending radially across the second undercut and interconnecting opposite surfaces of the second undercut.

8. The journal bearing as defined in claim 1, wherein the stiffening member has a radially tapering profile such that a thickness of the stiffening member decreases from a radially outward portion to a radially inward portion of the stiffening member when viewed in a plane normal to the central axis of the journal bearing.

9. The journal bearing as defined in claim 1, wherein the stiffening member has a radially convergent-divergent profile such that a thickness of a radially outward portion and a radially inward portion of the stiffening member decreases toward one another when viewed in a plane normal to the central axis of the journal bearing.

10. The journal bearing as defined in claim 1, wherein the stiffening member and the journal are integrally formed as a monolithic piece.

11. A method of operating a journal bearing, the journal bearing having a journal extending along a central axis, the journal having at least one undercut defined circumferentially about the central axis at an axial end face thereof, and having a pin receiving aperture extending through the journal along the central axis, the method comprising:
transmitting a journal bearing load to the journal in a direction transverse to the central axis,
responsive to said journal bearing load, deforming elastically an axial end portion of the journal, the axial end portion extending from the axial end face of the journal, and
limiting a local deformation of the axial end portion of the journal via a stiffening member extending radially across the undercut and interconnecting opposite surfaces of the undercut.

12. The method as defined in claim 11, wherein limiting the local deformation of the axial end portion of the journal includes transmitting at least part of the journal bearing load to a plurality of said stiffening member extending across the undercut and interconnecting the opposite surfaces of the undercut.

13. The method as defined in claim 12, wherein limiting the local deformation of the axial end portion of the journal includes transmitting at least part of the journal bearing load to a plurality of said stiffening member forming an array of spiral shaped ribs circumferentially distributed in the undercut.

14. The method as defined in claim 11, wherein limiting the local deformation of the axial end portion of the journal includes transmitting at least part of the journal bearing load to two of said stiffening member interconnecting the opposite surfaces of the undercut, the two stiffening members disposed on opposed sides of the pin receiving aperture of the journal.

15. The method as defined in claim 11, wherein limiting the local deformation of the axial end portion of the journal includes transmitting at least part of the journal bearing load to two stiffening members interconnecting the opposite surfaces of the undercut, the two stiffening members disposed on opposed sides of the pin receiving aperture of the journal axisymmetrically about the central axis.

16. The method as defined in claim 11, wherein limiting the local deformation of the axial end portion of the journal includes transmitting at least part of the journal bearing load to the stiffening member integrally with the journal as a monolithic piece.

17. A journal bearing for a gas turbine engine, comprising a tubular body extending axially along a central axis, the tubular body having a pin receiving aperture extending along the central axis from a first axial end face to a second opposite axial end face, holes projecting into the first axial end face toward the second axial end face and having a finite depth, the holes circumferentially disposed about the central axis, and respective webs of material defined between adjacent holes.

18. The journal bearing as defined in claim 17, wherein the webs of material have a radially tapering profile such that a thickness of the webs decreases from a radially outward portion to a radially inward portion of the webs when viewed in a plane normal to the central axis of the journal bearing.

19. The journal bearing as defined in claim 17, wherein the tubular body has two holes in the first axial end face and two webs of material each defined between respective circumferential ends of said holes.

20. The journal bearing as defined in claim 17, wherein the webs are circumferentially skewed.

\* \* \* \* \*